(12) United States Patent
Seo et al.

(10) Patent No.: US 10,362,598 B2
(45) Date of Patent: Jul. 23, 2019

(54) METHOD FOR RELAYING D2D LINK IN WIRELESS COMMUNICATION SYSTEM AND DEVICE FOR PERFORMING SAME

(71) Applicant: LG ELECTRONICS INC., Seoul (KR)

(72) Inventors: Inkwon Seo, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 15/532,906

(22) PCT Filed: Dec. 1, 2015

(86) PCT No.: PCT/KR2015/012980
§ 371 (c)(1),
(2) Date: Jun. 2, 2017

(87) PCT Pub. No.: WO2016/089081
PCT Pub. Date: Jun. 9, 2016

(65) Prior Publication Data
US 2017/0359835 A1    Dec. 14, 2017

Related U.S. Application Data

(60) Provisional application No. 62/087,789, filed on Dec. 4, 2014, provisional application No. 62/092,215, filed on Dec. 15, 2014, provisional application No. 62/098,337, filed on Dec. 31, 2014.

(51) Int. Cl.
*H04B 7/14* (2006.01)
*H04B 7/26* (2006.01)
(Continued)

(52) U.S. Cl.
CPC .............. *H04W 72/14* (2013.01); *H04B 7/14* (2013.01); *H04B 7/2606* (2013.01);
(Continued)

(58) Field of Classification Search
CPC ..... H04W 72/04; H04W 72/12; H04W 72/14; H04W 76/10
See application file for complete search history.

(56) References Cited

U.S. PATENT DOCUMENTS

2014/0023008 A1    1/2014  Ahn et al.
2014/0328329 A1*  11/2014  Novlan ............... H04W 72/042
                                                370/336
(Continued)

FOREIGN PATENT DOCUMENTS

WO         2013025040         2/2013

OTHER PUBLICATIONS

PCT International Application No. PCT/KR2015/012980, Written Opinion of the International Searching Authority dated Mar. 4, 2016, 20 pages.

(Continued)

*Primary Examiner* — Kevin C. Harper
(74) *Attorney, Agent, or Firm* — Lee Hong Degerman Kang Waimey

(57) ABSTRACT

A method for performing a device-to-device (D2D) relay operation by a D2D terminal supporting D2D communication according to an embodiment of the present invention comprises the steps of: transmitting, to a base station, a D2D relay request including information on multiple D2D links capable of being relayed; and acquiring at least one D2D grant from the base station on the basis of one of multiple radio network temporary identities (RNTIs) allocated to the D2D terminal, wherein when the at least one D2D grant approves the D2D relay request, the at least one D2D grant is indicated by a second RNTI which is different from a first RNTI used for approving a D2D synchronization operation or a D2D discovery operation among the multiple RNTIs.

7 Claims, 13 Drawing Sheets

(51) Int. Cl.
*H04W 8/00* (2009.01)
*H04W 52/36* (2009.01)
*H04W 56/00* (2009.01)
*H04W 72/04* (2009.01)
*H04W 72/12* (2009.01)
*H04W 72/14* (2009.01)
*H04W 76/10* (2018.01)
*H04W 88/04* (2009.01)
*H04W 88/08* (2009.01)

(52) U.S. Cl.
CPC ......... *H04W 8/005* (2013.01); *H04W 56/001* (2013.01); *H04W 72/04* (2013.01); *H04W 72/12* (2013.01); *H04W 76/10* (2018.02); *H04W 52/365* (2013.01); *H04W 88/04* (2013.01); *H04W 88/08* (2013.01)

(56) References Cited

U.S. PATENT DOCUMENTS

2015/0029866 A1* 1/2015 Liao ............... H04W 4/023 370/241
2015/0055567 A1* 2/2015 Narasimha ............ H04W 76/14 370/329
2015/0163789 A1* 6/2015 Vasudevan ............ H04W 76/14 370/259
2015/0271846 A1* 9/2015 Kowalski ............. H04W 72/14 370/329
2016/0128082 A1* 5/2016 Chen .................... H04W 72/10 370/329

OTHER PUBLICATIONS

Asustek, "Discussion on Differentiability of D2D grant", 3GPP TSG RAN WG1 Meeting #78bis, R1-144288, Oct. 2014, 3 pages.
Ericsson, "On Scrambling of D2D Physical Channels", 3GPP TSG RAN WG1 Meeting #76, R1-140777, Feb. 2014, 5 pages.
LG Electronics, "UE Procedure in Mode 1 Communication", 3GPP TSG RAN WG1 Meeting #78, R1-143181, Aug. 2014, 5 pages.
European Patent Office Application Serial No. 158662833, Search Report dated Jun. 18, 2018, 9 pages.
Anonymous: "LTE Quick Reference", Retrieved from the web, Mar. 2011, XP055290856, 3 pages.

* cited by examiner

FIG. 5
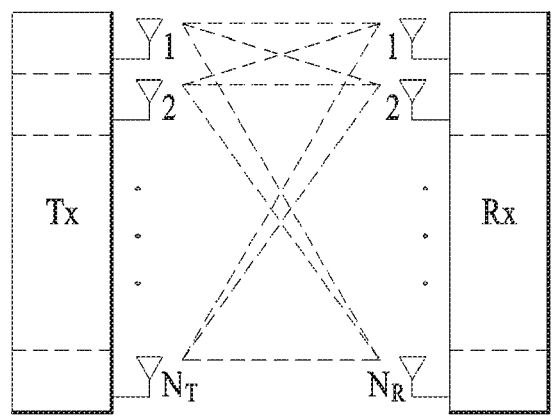
(a)
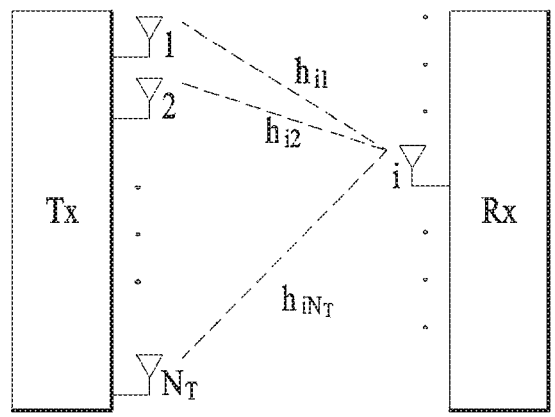
(b)

METHOD FOR RELAYING D2D LINK IN WIRELESS COMMUNICATION SYSTEM AND DEVICE FOR PERFORMING SAME

CROSS-REFERENCE TO RELATED APPLICATIONS

This application is the National Stage filing under 35 U.S.C. 371 of International Application No. PCT/KR2015/012980, filed on Dec. 1, 2015, which claims the benefit of U.S. Provisional Appliation Nos. 62/087,789, filed on Dec. 4, 2014, 62/092,215, filed on Dec. 15, 2014 and 62/098,337, filed on Dec 31, 2014, the contents of which are all hereby incorporated by reference herein in their entirety.

TECHNICAL FIELD

The present invention relates to a wireless communication system, and more particularly, to a method for a D2D (device to device) UE supporting D2D communication to relay multiple D2D links and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

A technical task of the present invention is to provide a method for a D2D UE supporting D2D communication to efficiently relay multiple links established with other D2D UEs and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing a device-to-device (D2D) relay operation by a D2D UE supporting D2D communication, includes transmitting, to a base station, a D2D relay request including information on multiple D2D links capable of being relayed and obtaining at least one D2D grant from the base station based on one of multiple radio network temporary identities (RNTIs) assigned to the D2D UE. In this case, when the at least one D2D grant approves the D2D relay request, the at least one D2D grant can be indicated by a second RNTI different from a first RNTI used for approving a D2D synchronization operation or a D2D discovery operation among the multiple RNTIs.

To further achieve these and other advantages and in accordance with the purpose of the present invention, according to another embodiment, a D2D UE supporting D2D communication includes a transmitter configured to transmit, to a base station, a D2D relay request including information on multiple D2D links capable of being relayed, and a processor configured to obtain at least one D2D grant from the base station based on one of multiple radio network temporary identities (RNTIs) assigned to the D2D UE. In this case, when the at least one D2D grant approves the D2D relay request, the at least one D2D grant can be indicated by a second RNTI different from a first RNTI used for approving a D2D synchronization operation or a D2D discovery operation among the multiple RNTIs.

To further achieve these and other advantages and in accordance with the purpose of the present invention, according to another embodiment, a method for a base station to support a D2D relay operation of a D2D UE, includes receiving, from the D2D UE, a D2D relay request including information on multiple D2D links capable of being relayed, and transmitting at least one D2D grant based on one of multiple radio network temporary identities (RNTIs) assigned to the D2D UE. In this case, when the at least one D2D grant approves the D2D relay request, the at least one D2D grant can be indicated by a second RNTI different from a first RNTI used for approving a D2D synchronization operation or a D2D discovery operation among the multiple RNTIs.

Preferably, an indication by the second RNTI may correspond to an implicit indication by scrambling a cyclic redundancy check (CRC) of the D2D grant by the second RNTI or an explicit indication by setting the second RNTI to reserved bits of the D2D grant.

Preferably, the D2D relay request can include at least one of a number of the multiple D2D links, sizes of D2D resources necessary for relaying the multiple D2D links, and a headroom report for D2D processing capability of the D2D UE.

Preferably, if a single D2D grant is provided to the multiple D2D links, the single D2D grant can indicate at least one of a resource pool for each of the multiple D2D links, a combination of D2D scheduling assignment (SA)

resources for the multiple D2D links, and a data region resource in which information on the D2D SA resources is transmitted.

Preferably, when multiple D2D grants are provided for the multiple D2D links, a different index can be assigned to the second RNTI of each of the multiple D2D grants.

More preferably, association information between the multiple D2D links and multiple resource pools or priority information among the multiple D2D links can be indicated based on at least one of an order of receiving the multiple D2D grants, an index of the second RNTI, and an scheduling assignment (SA) resource indicator field included in the multiple D2D grants.

Preferably, the at least one D2D grant can include control information common to the multiple D2D links and control information specific to each of the multiple D2D links.

Preferably, the D2D UE can transmit, through at least one D2D resource pool, multiple D2D scheduling assignments (SAs) for scheduling the multiple D2D links, based on the D2D resource information.

More preferably, the multiple D2D SAs are transmitted in a data subframe following SA subframes in which control information of a single D2D SA format is transmitted and the control information of the single D2D SA format transmitted in the SA subframes may include location information of the multiple D2D SAs transmitted in the data subframe.

Advatageous Effects

According to one embodiment of the present invention, if a D2D relay operation is performed based on an approval of a base station, although multiple D2D links are relayed, it is able to reduce interference caused by the D2D links or interference between the D2D links. And, it is able to more efficiently configure data resources or SA resources for the multiple links.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 5 is a diagram showing the configuration of a wireless communication system having multiple antennas.

MODE FOR INVENTION

Figure 1:
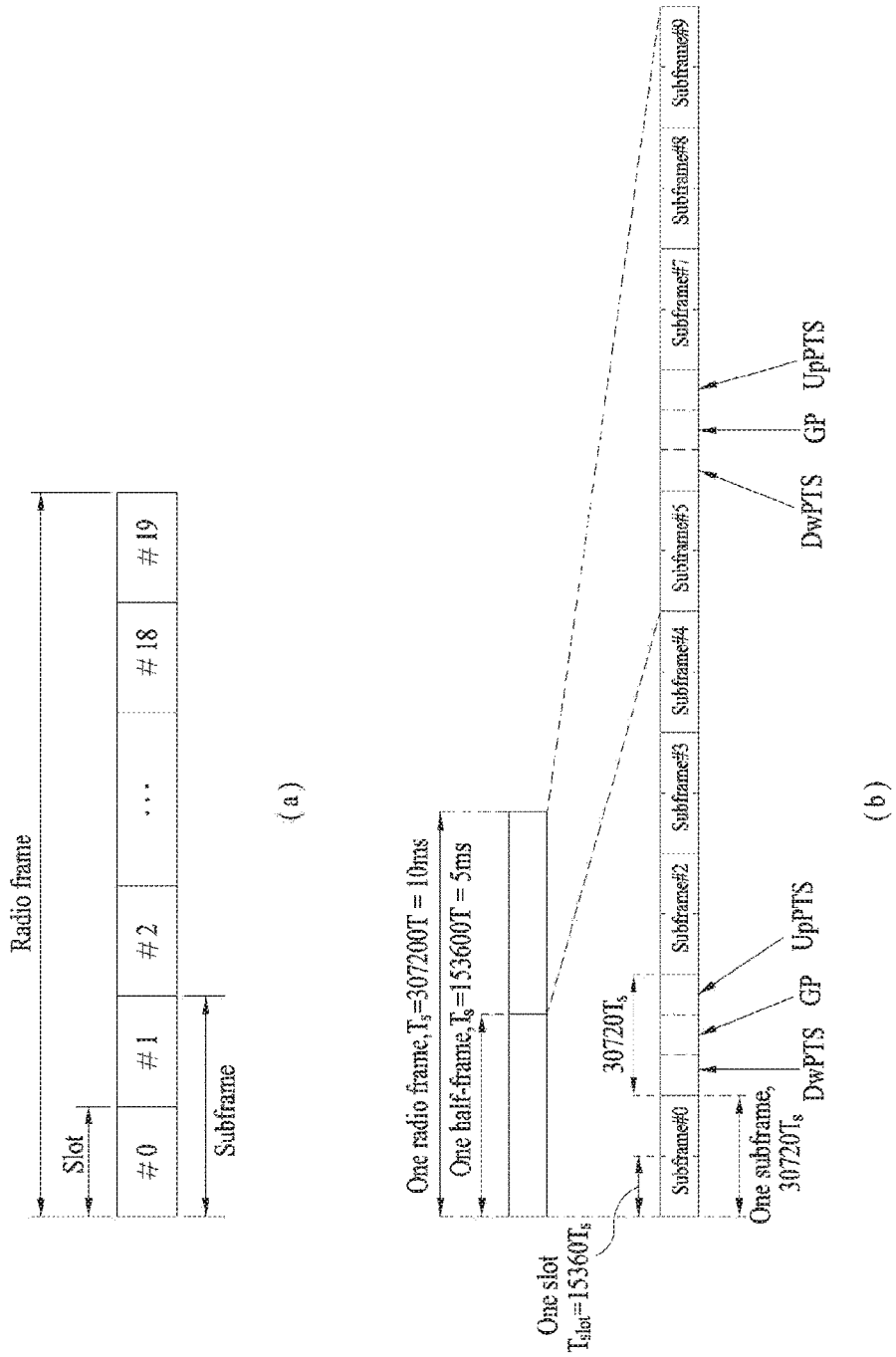
FIG. 1 is a diagram showing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A resource structure/channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
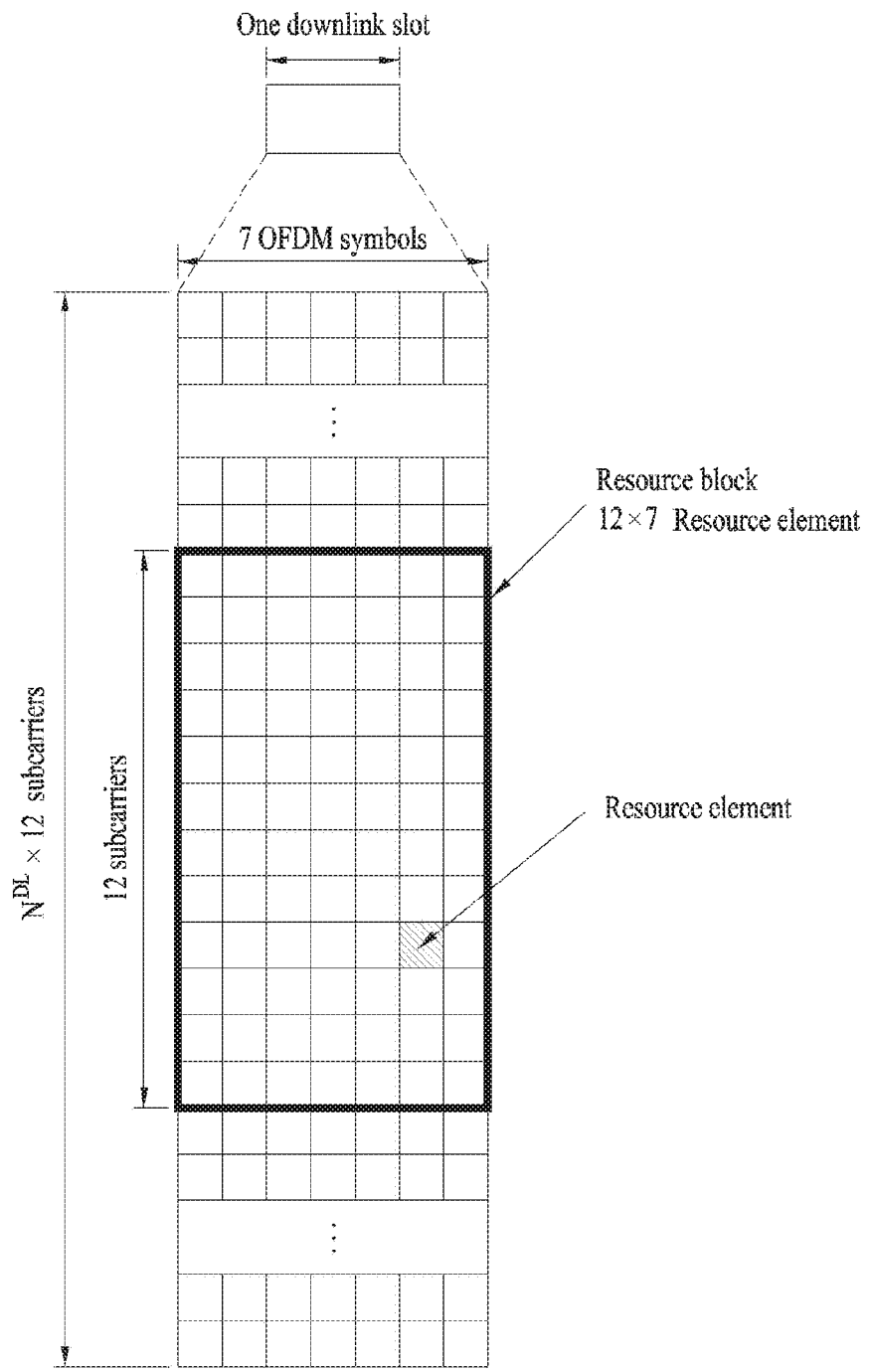
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
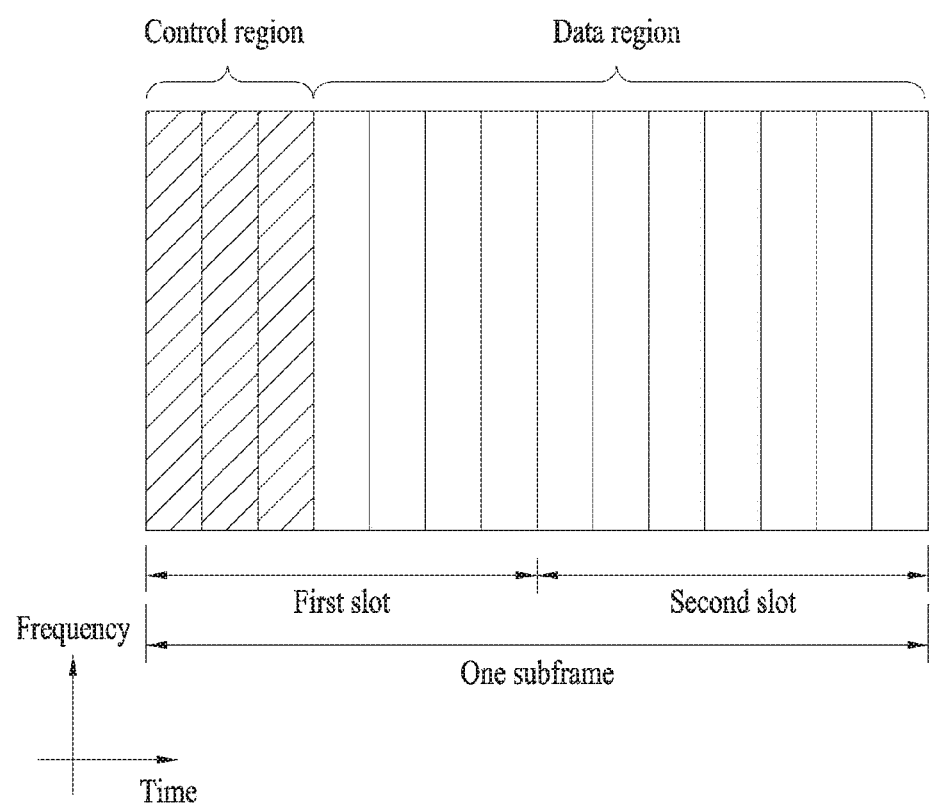
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
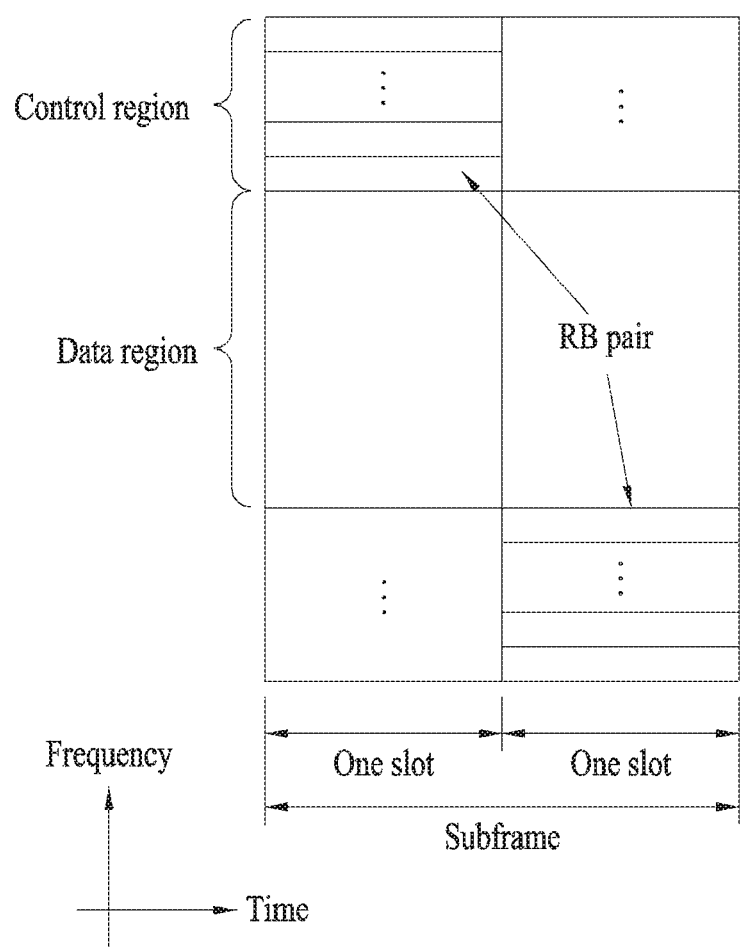
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:
i) Cell-specific Reference Signal (CRS) shared among all UEs of a cell;
ii) UE-specific RS dedicated to a specific UE;
iii) DM-RS used for coherent demodulation of a PDSCH, when the PDSCH is transmitted;
iv) Channel State Information-Reference Signal (CSI-RS) carrying CSI, when downlink DM-RSs are transmitted;
v) Multimedia Broadcast Single Frequency Network (MBSFN) RS used for coherent demodulation of a signal transmitted in MBSFN mode; and
vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad [\text{Equation 1}]$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \qquad [\text{Equation 2}]$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1, \hat{s}_2, \ldots \hat{s}_{N_T}]^T=[P_1s_1, P_2s_2, \ldots, P_{N_T}s_{N_T}]^T \quad \text{[Equation 3]}$$

In addition, $\hat{S}$ can be represented as Equation 4 using diagonal matrix P of the transmission power.

[Equation 4]

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$

Assuming a case of configuring NT transmitted signals $$x_1, x_2, \ldots, x_{N_T},$$

which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y=[y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T=[h_{i1}, h_{i2}, \ldots, h_{iN_T}] \quad \text{[Equation 8]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1$, $n_2, \ldots, n_{N_R}$ respectively added to the NR receive antennas can be expressed as follows.

$$n=n[n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

PSS (Primary Synchronous Signal)/SSS (Secondary Synchronous Signal)

Figure 6:
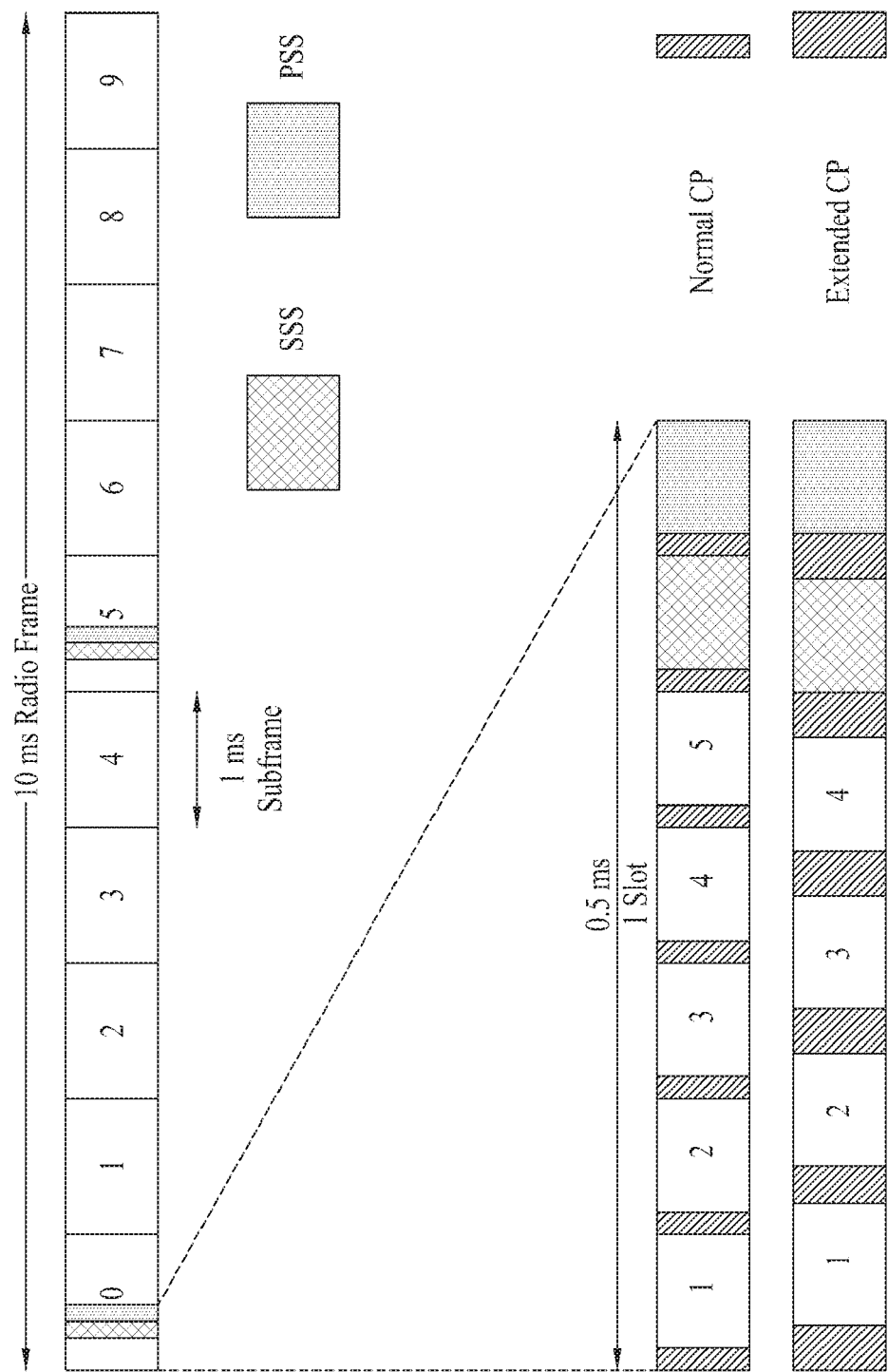
FIG. 6 is a diagram of PSS and SSS of a 3GPP system.

FIG. 6 is a diagram for explaining a PSS and an SSS corresponding to synchronization signals used for a cell search in LTE/LTE-A system. Before the PSS and the SSS are explained, a cell search is explained. When a user equipment initially accesses a cell, the cell search is performed for a case of performing a handover from the currently accessed cell to a different cell, a case of reselecting a cell or the like. The cell search may include acquisition of frequency and symbol synchronization for a cell, acquisition of downlink frame synchronization for a cell and determination of a cell identifier (ID). One cell group consists of three cell identifiers and there may exist 168 cell groups.

An eNB transmits a PSS and an SSS to perform a cell search. A user equipments obtains 5 ms timing of a cell by detecting the PSS and may be able to know a cell identifier included in a cell group. And, the user equipment is able to know radio frame timing and a cell group by detecting the SSS.

Referring to FIG. 6, a PSS is transmitted in a $0^{th}$ and a $5^{th}$ subframe. More specifically, the PSS is transmitted on the last ODFM symbol of a first slot of the $0^{th}$ subframe and the last OFDM symbol of a first slot of the $5^{th}$ subframe, respectively. And, the SSS is transmitted on the last but one OFDM symbol of the first slot of the $0^{th}$ subframe and the last but one OFDM symbol of the first slot of the $5^{th}$ subframe, respectively. In particular, the SSS is transmitted on an OFDM symbol right before an OFDM symbol on which the PSS is transmitted. The aforementioned transmission timing corresponds to a FDD case. In case of TDD, the PSS is transmitted on a third symbol of the $1^{st}$ subframe and a third symbol of a $6^{th}$ subframe (i.e., DwPTS) and the SSS is transmitted on the last symbol of a $0^{th}$ subframe and the last symbol of a $5^{th}$ subframe. In particular, the SSS is transmitted on a symbol preceding as many as 3 symbols of a symbol on which the PSS is transmitted in the TDD.

The PSS corresponds to a Zadoff-Chu sequence of a length of 63. The PSS is actually transmitted on 73 center subcarriers (72 subcarriers except a DC subcarrier, i.e., 6 RBs) of a system frequency bandwidth in a manner that 0 is padding to both ends of the sequence. The SSS consists of a sequence of a length of 62 in a manner that two sequences each of which has a length of 31 are frequency-interleaved. Similar to the PSS, the SSS is transmitted on the center 72 subcarriers of the whole system bandwidth.

PBCH (Physical Broadcast Channel)

Figure 7:
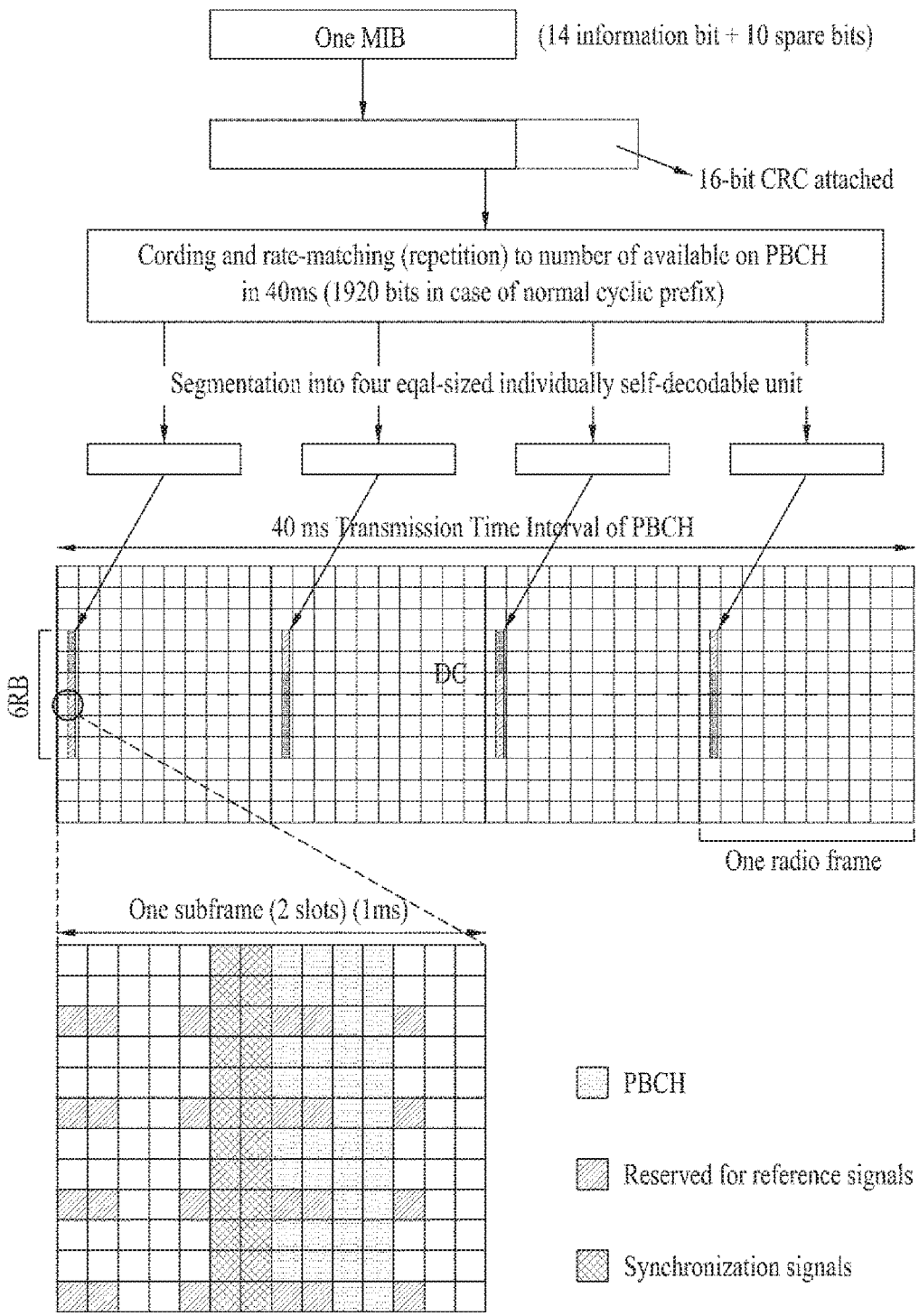
FIG. 7 is a diagram of PBCH of a 3GPP system.

FIG. 7 is a diagram for explaining PBCH. The PBCH corresponds to a channel on which system information corresponding to a master information block (MIB) is transmitted. The PBCH is used to obtain system information after a user equipment obtains synchronization and a cell identifier via the aforementioned PSS/SSS. In this case, downlink cell bandwidth information, PHICH configuration information, a subframe number (a system frame number (SFN)) and the like can be included in the MIB.

As shown in FIG. 7, one MIB transport block is transmitted via a first subframe in each of 4 consecutive radio frames. More specifically, PBCH is transmitted on first 4 OFDM symbols of a second slot of a $0^{th}$ subframe in the 4 consecutive radio frames. Hence, the PBCH configured to transmit a MIB is transmitted with an interval of 40 ms. The PBCH is transmitted on center 72 subcarriers of a whole bandwidth in frequency axis. The center 72 subcarriers correspond to 6 RBs corresponding to a smallest downlink bandwidth. This is intended to make a user equipment decode BCH without any problem although the user equipment does not know a size of the whole system bandwidth.

Initial Access Procedure

Figure 8:
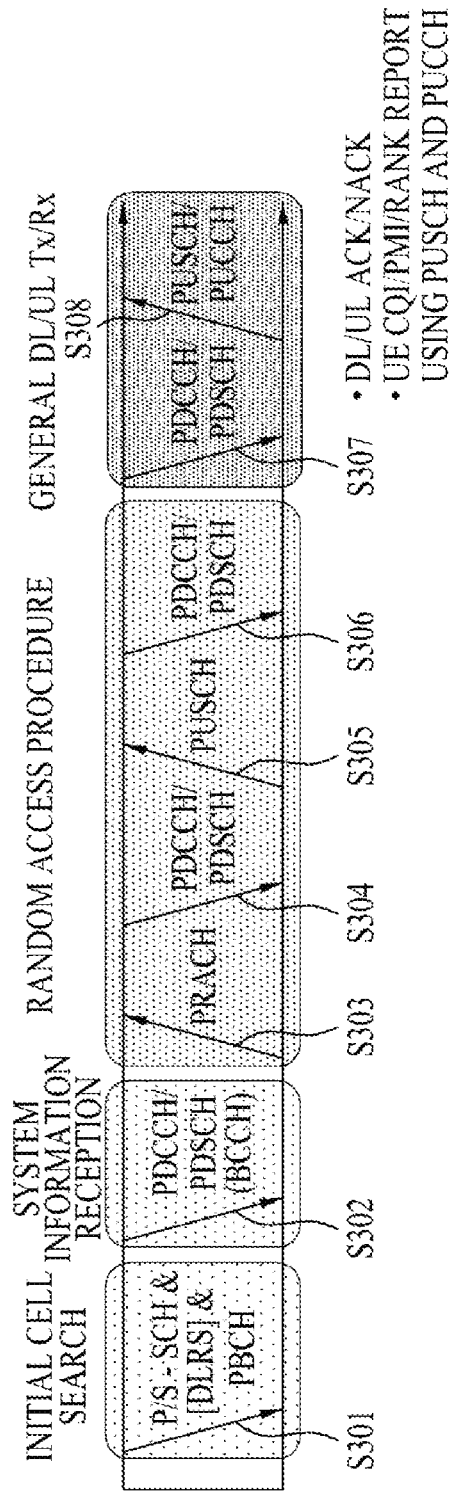
FIG. 8 is a diagram to describe an initial access procedure and signal transceiving method of a 3GPP system.

FIG. 8 is a diagram to describe an initial access procedure and signal transceiving method of a 3GPP system.

If a power of a UE is turned on or the UE newly enters a cell, the UE performs an initial cell search for matching synchronization with a base station and the like [S301]. To this end, the UE receives PSS and SSS from the base station, matches synchronization with the base station and then obtains information such as a cell ID and the like. Subsequently, the UE receives PBCH (physical broadcast channel) from the base station and is then able to obtain intra-cell broadcast information. Meanwhile, the UE receives a downlink reference signal (DL RS) in the initial cell searching step and is then able to check a downlink channel status.

Having completed the initial cell search, the UE receives a physical downlink control channel (PDCCH) and a physical downlink shared control channel (PDSCH) according to information carried on the physical downlink control channel (PDCCH) and is then able to obtain system information in further detail [S302].

Meanwhile, if the UE initially accesses the base station or fails to have a radio resource for signal transmission, the UE may perform a random access procedure (RACH) on the base station [steps S303 to S306]. To this end, the UE transmits a specific sequence as a preamble via a physical random access channel (PRACH) [S303, S305] and is then able to receive a response message via PDCCH and a corresponding PDSCH in response to the preamble [S304, S306]. In case of contention based RACH, a contention resolution procedure may be performed in addition.

Having performed the above mentioned procedures, the UE may perform PDCCH/PDSCH reception [S307] and PUSCH/PUCCH (physical uplink shared channel/physical uplink control channel) transmission [S308] as a general uplink/downlink signal transmission procedure. In particular, the UE receives a downlink control information (DCI) via PDCCH. In this case, the DCI includes such control information as resource allocation information on a UE and may differ in format in accordance with the purpose of its use.

Meanwhile, control informations transmitted to or received from the base station by the UE include DL/UL ACK/NACK signal, CQI (channel quality indicator), PMI (precoding matrix index), RI (rank indicator) and the like. In case of the 3GPP LTE system, the UE may transmit the above-mentioned control informations such as CQI, PMI, RI and the like via PUSCH and/or PUCCH.

D2D (Device to Device) Communication Environment

D2D communication means a direct communication between UEs, and a term 'D2D' may be substituted with or used interchangeably with a term 'sidelink'. D2D UE means US supportive of D2D. UE may mean D2D UE unless legacy UE is mentioned specially.

In D2D communication, the coverage of an eNB can be increased through a relay UE or a coverage hole and the like can be overcome. According to embodiments of the present invention, for a communication between an eNB and a UE unable to directly receive a signal from the eNB, methods of selecting a relay UE are proposed. The following description is made by focusing on a method for relaying a communication between an eNB and a UE, by which the present invention is non-limited. And, embodiments of the present invention are applicable for a communication between UEs that configure a D2D pair.

Figure 9:
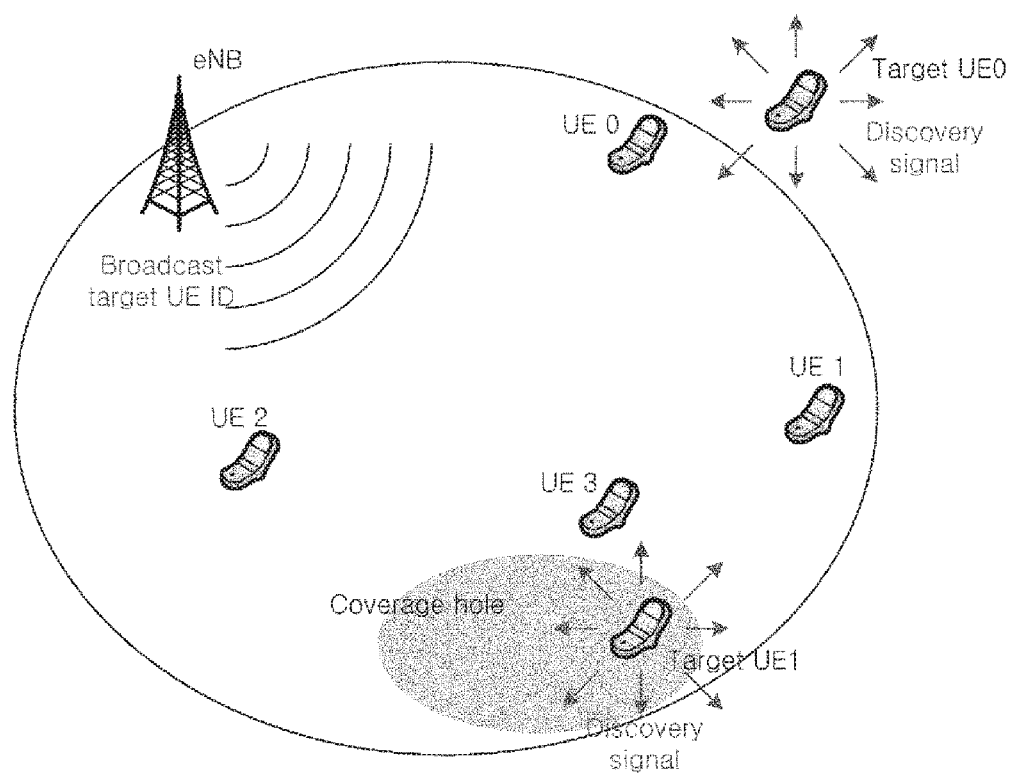
FIG. 9 is a diagram to describe D2D communication according to one embodiment of the present invention.

FIG. 9 is a diagram to describe D2D communication according to one embodiment of the present invention.

Referring to FIG. 9, Target UE is D2D UE requiring a relaying of a relay UE. Target UE0 is assumed as located out of a coverage of an eNB. And, Target UE1 is assumed as located at a coverage hole within the coverage. Hence, the Target UEs (Target UE0, Target UE1) are unable to perform direct communication with the eNB, and a relay UE is necessary for the communication with the eNB.

If Target UEs are D2D UEs supportive of D2D, the Target UEs send discovery signals at a specific timing. UEs located around the Target UEs detect the discovery signals and are then aware that the Target UEs are located around them. Meanwhile, signals sent by the Target UEs are non-limited by the discovery signals. Signals (e.g., Scheduling Assignment, D2D data, etc.) containing or inferring IDs (or informations corresponding to IDs) of the Target UEs can be sent from the Target UEs.

D2D Communication

A D2D operation can be divided into D2D synchronization, D2D discovery operation, and D2D communication. And, the D2D communication is divided into a D2D communication mode 1 and a D2D communication mode 2 according to a resource allocation scheme for the D2D communication. For clarity, 'D2D communication mode' is simply called 'mode'. Yet, it is apparent to those skilled in the art that the D2D communication mode is different from an eNB-UE communication mode (e.g., DL TMs 0 to 10 and UL TMs 0 to 1).

According to the mode 1, both information on a D2D resource pool and information on a T-RPT (time resource pattern) are indicated by a base station or a head UE of a D2D cluster. The D2D resource pool corresponds to a set of resources capable of performing a D2D operation. In eNB-UE communication, the resource pool may correspond to a UL resource. The T-RPT indicates a time resource for a D2D operation. For example, a unit of the T-RPT may correspond to a subframe. The T-RPT can be configured by a bitmap including a plurality of bits each of which corresponds to a subframe.

According to the mode 2, the T-RPT is not indicated. A D2D UE performing D2D communication in the mode 2 autonomously selects a resource from a resource pool range, which is configured by an eNB or a head UE of a D2D cluster in advance.

In the following description, such a terminology as an eNB is used for clarity. The eNB can be comprehended as a general entity/node that manages D2D resources. For example, if a D2D cluster is formed at out-of-coverage, a D2D UE (head UE) playing a role in allocating a resource in the D2D cluster map perform a role of an eNB described in the following.

When a D2D UE intends to perform D2D communication, the D2D UE may request a resource for the D2D communication to an eNB and the eNB can allocate a resource for the mode 1 or the mode 2. The eNB can allocate a D2D resource via cell-specific signaling (e.g., SIB, etc.) or D2D UE-specific signaling (e.g., DCI indicated by D2D-RNTI). For example, the DCI (downlink control information) indicated by the D2D-RNTI may correspond to DCI on (e)PDCCH that a CRC is scrambled by the D2D-RNTI.

If DCI is used for D2D resource allocation, the DCI can include information on a hopping flag, a D2D scheduling assignment (SA) resource index, TPC (transmission power control), and the like.

When communication is performed between D2D UEs, D2D scheduling assignment (SA) plays a role similar to a role of (e)PDCCH in eNB-UE communication. For example, the D2D SA forwards information on a D2D transmission/reception schedule. A D2D UE 1 transmits the D2D SA to a D2D UE 2 to schedule D2D communication. The D2D SA is transceived between D2D UEs via a D2D resource. The D2D resource is indicated by DCI received from an eNB or can be selected from resources indicated by the DCI. In case of the mode 1, a D2D SA resource index included in the DCI specifically indicates a D2D resource used for transmitting the D2D SA. On the contrary, in case of the mode 2, a D2D UE can autonomously select a resource for transmitting the D2D SA.

In D2D communication, single D2D SA is transmitted via one physical resource block pair (PRB pair). A D2D SA bit sequence corresponding to a redundancy version 0 is transmitted two times. In this case, each D2D SA transmission resource can be determined based on a D2D SA resource index included in DCI.

Information delivered through the D2D SA can include at least one of an MCS (modulation and coding scheme) for D2D data transmission and reception, an ID, D2D reception timing adjustment, resource allocation information and/or a resource allocation type (e.g., Rel-8 UL type0 resource allocation type), and a T-RPT index. In case of the mode 1, resource information signaled by an eNB via D2D DCI can be delivered through the D2D SA.

D2D Relaying

Meanwhile, a current D2D operation is designed for the purpose of broadcasting and discussion on 1:1 communication between D2D UEs is in progress. In the future, the D2D operation can be developed to perform unicast, a D2D relay operation, and the like. The D2D relay operation can be defined as a subordinate concept of a D2D communication operation or a separate operation distinguished from the D2D communication operation. According to one embodiment of the present invention, if a D2D UE relay is implemented via a D2D operation, a resource allocation method for relaying a plurality of D2D links is proposed. Yet, embodiments of the present invention are not restricted to a D2D relay operation. The embodiments of the present invention can also be applied to a situation (e.g., D2D multicast) that a single D2D UE transmits data to a plurality of D2D links.

Figure 10:
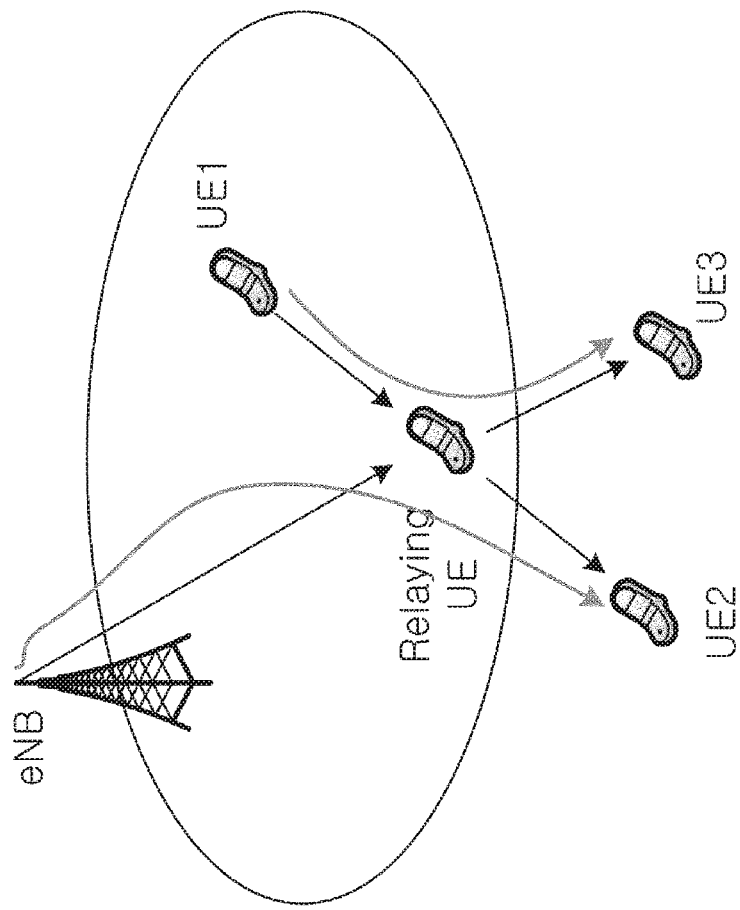
FIG. 10 is a diagram illustrating an example that a D2D UE delivers data received from a plurality of sources to a plurality of destinations.

FIG. 10 is a diagram illustrating an example that a D2D UE delivers data received from a plurality of sources to a plurality of destinations. Referring to FIG. 10, a D2D relay UE forwards data received from an eNB to a D2D UE2 and forwards data received from a D2D UE1 to a D2D UE3. In order to perform the D2D relay operation, the D2D relay UE receives information on resources to which each data is to be transmitted from the eNB and forwards the information (e.g., D2D SA) to final reception UEs.

1. Initiation of D2D Operation

A D2D UE capable of performing a D2D relay can receive a request for a relay operation from a neighboring D2D UE or an eNB. In order to receive the relay operation request, D2D UEs capable of performing relay select D2D UEs capable of performing D2D communication from among neighboring UEs (e.g., UEs requiring relay) existing in the vicinity of the D2D UEs via discovery signal detection. The D2D UEs capable of performing relay may report or notify information on the selected D2D UEs periodically or at a timing indicated by the eNB. When the information on the selected D2D UEs is shared, if it is difficult for data sources intending to perform communication to establish a direct connection with a destination, the data sources can make a request for a relay to the destination and the D2D UEs capable of performing D2D communication. For example, an eNB can make a request for a relay to a D2D UE not based on broadcast communication but based on unicast D2D communication. As a different embodiment, if there are a plurality of information to be broadcasted, an eNB may ask a D2D UE to transmit a plurality of D2D data.

2. D2D Resource Request

If a relay request is received or relay requests different from each other are received as many as a certain number, a D2D UE capable of performing a D2D relay operation can make a request for a resource for D2D communication (e.g., resource for D2D relay) to an eNB.

A D2D resource request can include an indicator indicating that a purpose of the D2D communication is to perform D2D relay. In addition to the resource request to be used for D2D relay, it may also report information (e.g., number of links, a size of a required resource, etc.) on a D2D link to be relayed.

In order to efficiently use a D2D resource, a D2D relay UE can include D2D capability capable of being additionally performed by the D2D relay UE in a D2D resource request message. The D2D capability may correspond to a parameter that represents the number of D2D operations or a size of the D2D operation capable of being additionally performed by the D2D UE in additional to the D2D operation requested by the D2D UE. For example, the D2D capacity may correspond to a D2D UE category, the number of FFT operations capable of being additionally performed by the D2D UE, the number of D2D layers capable of being processed, the number of antennas, and the like, by which the present invention may be non-limited. Meanwhile, the D2D capacity can be reported by a request of a D2D resource, periodically, and aperiodically by a request of the eNB.

Resources used for a D2D operation can be divided into a resource pool configuration allocated for a D2D usage and a resource allocation practically used for transmitting D2D data. The resource pool configuration can be configured in advance or can be set to a D2D UE via higher layer signal such as SIB and/or D2D UE dedicated signaling. Subsequently, D2D UEs intending to perform a D2D operation may select a D2D resource to be practically used for a D2D operation from a resource pool based on a D2D communication mode (e.g., mode 2) or may receive a D2D resource to be practically used in a manner of being indicated by an eNB (e.g., mode 1).

Relaying Multiple Links

In order to relay multiple links, it may differently configure a resource for relaying according to a link. One embodiment of the present invention proposes a method of allocating a resource for relaying multiple links. Resource allocation embodiments described in the following can be independently implemented or can be implemented by a combination of the embodiments. Resource allocation methods described in the following embodiments can be applied not only to a purpose of relaying multiple links but also to a different D2D operation.

If a D2D relay operation described in the following is used for relay among a plurality of D2D UEs, a resource used for the D2D relay operation can include at least a part of a resource for receiving a relay target data from a source and a resource for relaying data to a destination. To this end, a resource pool can be divided into a resource pool used for a D2D relay UE to receive data and a resource pool used for the D2D relay UE to transmit data. The resource pools can be defined or signaled in advance in a manner of being divided. In case of performing a D2D relay operation, if the resource pools are configured for transmission and reception, respectively, the embodiments described in the following can be respectively applied to a control signal for the resource pool used for transmission and a control signal for the resource pool used for reception. Or, the embodiments can also be applied to a control signal including both the resource pool used for transmission and the resource pool used for reception.

1. D2D Grant for Relaying Multiple Links

In the following, such a terminology as a D2D grant is defined as downlink control information or a physical downlink control channel transmitted by an eNB to approve a D2D operation of a D2D UE. Hence, similar to a UL grant and a DL grant, the D2D grant corresponds to information transceived between the eNB and the D2D UE. For example, a DCI format 5 corresponds to an example of the D2D grant. Scheduling assignment transmitted by the D2D UE to a different D2D UE on a D2D link is simply called D2D SA, SA, or SCI (sidelink control information). Since the D2D grant corresponds to DCI transmitted on (e)PDCCH, the D2D grant is different from SCI transmitted on a PSCCH (physical sidelink control channel).

A D2D grant includes resource allocation information on a single D2D link and TPC information. Having received the D2D grant, a D2D UE can perform D2D communication (e.g., D2D SA and data transmission) based on the information included in the D2D grant.

One embodiment of the present invention proposes a method of forwarding a plurality of information necessary for relaying multiple links using a D2D grant. A plurality of the information necessary for relaying the multiple links may relate to D2D communication.

A D2D transmitter capable of performing relay (e.g., D2D relay UE) can perform D2D transmission in a D2D resource indicated by schemes described in the following. The schemes described later can be classified into a first type and a second type according to an approval type.

(1) The first type corresponds to a type of signaling control information on a plurality of relay target links using a single D2D grant. The first type can include (i) a method of extending a size of a D2D grant to make the D2D grant include information on a plurality of links, (ii) a method of signaling an index of a specific state via a D2D grant among a plurality of states that information on a plurality of links are combined, and (iii) a method of signaling control information on a plurality of links via a data resource of a location indicated by a D2D grant.

(2) The second type corresponds to a type of signaling control information on a single link only using a single D2D grant. The second type can include (iv) a method of indicating priority or a resource pool using an index while indexing R-RNTI (Relay-RNTI), (v) a method of indicating priority or a resource pool based on an arrival order of a D2D grant instead of R-RNTI indexing, and (vi) a method of adding a priority field to a D2D grant.

In the following description, R-RNTI corresponds to an identifier for identifying a D2D grant that transmits control information for relaying. If a field indicating a grant for a relay operation is added to a D2D grant, it may be able to explicitly indicate the R-RNTI. Or, if a CRC of a channel on which a D2D grant is transmitted is scrambled with R-RNTI, it may be able to implicitly indicate the R-RNTI. A R-RNTI for a first type grant and a R-RNTI for a second type grant can be called a first type R-RNTI and a second type R-RNTI, respectively.

In the following, the first type and the second type grants are explained in detail.

(1) First Type

The first type R-RNTI can indicate that control information (e.g., D2D grant) indicated by R-RNTI relates to a D2D relay operation. The first type R-RNTI can also indicate that a single D2D grant provides information on multiple links.

It may consider (i), (ii), and (iii) methods described in the following as a method for the first type R-RNTI to provide information on multiple relay links.

(i) Information on multiple links can be included in a D2D grant by increasing a size of the D2D grant. The information on the links can include information on a resource pool at which a link is located. And, the number of links capable of being relayed by a relay operation of a single D2D UE can be determined in advance or can be signaled by an eNB. If the number of links is signaled by the eNB, a length of an information bit of the D2D grant may vary depending on the number of links. According to the present embodiment, although the information on the multiple links is able to be delivered at a time using a single D2D grant, since a length of the D2D grant varies, blind detection complexity of a D2D UE monitoring the D2D grant may increase. In order to solve the overhead increase problem, it is necessary to define a new DCI format for the D2D grant.

(ii) It may be able to define a combination of multiple links and signal an index of a combination list using a specific field of a D2D grant. In this case, it may be able to define a new field or reuse a previously existing field for a different usage for the specific field.

For example, PRB information to be used for first and second transmissions of D2D SA is indicated via a D2D SA resource index field of 6 bits in a current D2D grant. Yet, according to the present embodiment, it may be able to predefine that 64 states according to the 6 bits indicate a plurality of D2D SA resource information.

For example, the 64 states can be divided into a plurality of groups and each of a plurality of the groups may correspond to a relay target link of a different number. For clarity, although it is explained as all of the 64 states are used, it is apparent to those skilled in the art that a part of the states is configured as a reserved state and the remaining state are used only.

More specifically, as shown in Table 1, assume a case that the 64 states according to the 6 bits are divided into two groups. For example, 0 to 31 states belong to a first group and 32 to 63 states may belong to a second group. And, the first group and the second group may have 2 relay target links and 3 relay target links, respectively. The states belonging to each group can indicate a combination of 2 or 3 D2D SA resource information. A link combination of each state can be defined in advance or can be indicated by higher layer signaling. Meanwhile, the number of states and an RA resource index are intended to help the understanding of the present invention and the present invention may be non-limited by the number of states and the RA resource index.

TABLE 1

| 6-bits in decimal | | D2D Link 1 | D2D Link 2 | D2D Link 3 |
|---|---|---|---|---|
| Group 1 | 0 | SA Resource #1 | SA Resource #2 | N/A |
|  | 1 | SA Resource #1 | SA Resource #3 | N/A |
|  | 2 | SA Resource #k | SA Resource #n | N/A |
|  | ... | | | |
| Group 2 | 32 | SA Resource #1 | SA Resource #2 | SA Resource #3 |
|  | 33 | SA Resource #1 | SA Resource #3 | SA Resource #5 |
|  | 34 | SA Resource #k | SA Resource #n | SA Resource #m |
|  | ... | | | |

Meanwhile, although a plurality of D2D SA resources are designated by a D2D SA resource index field, a time/frequency resource of data can be designated by a single resource set shared by all links. In this case, a D2D relay UE can distribute and transmit a time/frequency resource according to a link in the resource set.

As a method for indicating that DCI corresponds to a D2D grant for multiple links according to the present embodiment (ii), if the R-RNTI is used or a reserved field is activated in the D2D grant, a D2D relay UE can recognize it as the D2D grant is used for a relay operation.

(iii) It may be able to reuses a current DCI format instead of newly defining a DCI format for a D2D grant. In this case, it may be able to map control information on multiple links to a resource (e.g., data resource) indicated by the D2D grant. For example, similar to a UE detecting SIB or paging information, a D2D relay UE decodes data located at a resource indicated by a D2D grant, which is indicated by the R-RNTI. A result of the decoding can include information on a resource necessary for the D2D relay UE to relay multiple links. Meanwhile, information on the multiple links, e.g., D2D SA or a data transmission resource, can be transmitted in a form of PDSCH. A resource indicated by a current D2D grant corresponds to a UL resource, whereas a resource indicated by the D2D grant according to the present embodiment corresponds to a DL resource, i.e., PDSCH. Hence, if a received D2D grant is indicated by R-RNTI, a resource indicated by the D2D grant is comprehended as a DL resource. On the contrary, if received D2D grant is indicated by D2D-RNTI (e.g., sidelink-RNTI), a resource indicated by the D2D grant is comprehended as a UL resource.

And, the information on the multiple links can be applied to a first D2D SA resource pool that appears after a prescribed processing time (e.g., 3 or 4 ms) is elapsed from a timing at which the information is received.

Although a current D2D grant (e.g., DCI format 5) is defined based on a UL grant (e.g., DCI format 0) of eNB-UE communication, if the information on multiple links is transmitted using the (iii) method, the current D2D grant can be defined based on a DL grant (e.g., DCI format 1/2) of the eNB-UE communication. For example, the DL grant of the eNB-UE communication may indicate a resource location to which the information on multiple links is transmitted by introducing a resource allocation scheme for indicating a PDSCH region to a D2D grant. According to the present embodiment, it may be able to maintain or reuse a format of a legacy DL grant. It may indicate that a specific DCI format corresponding to the legacy DL grant and an information bit length are identically configured. In this case, it is not mandatory that fields of DCI are identical to each other.

Meanwhile, according to a different embodiment of the present invention, a D2D grant can be configured by a length identical to a length of a DCI format 4 of a UL grant of eNB-UE communication. For example, at least one of a D2D SA resource index field (e.g., resource for PSCCH) and a T-RPT field may exist according to each link.

According to the present embodiment, at least a part of the information on the simultaneously indicated multiple links can be commonly applied to at least a part of the multiple links. For example, a part of a plurality of fields included in a D2D grant is commonly applied to a plurality of links and the rest of fields can be specifically applied to an individual link. In particular, the D2D grant can include at least one field having an attribute common to D2D links and at least one field having an attribute specific to the D2D links.

More specifically, a TPC field is explained. The TPC field can be configured to have an attribute common to the D2D links. An eNB can perform power control to indicate a UE in an emergency situation to use maximum transmit power. In the emergency situation, it may be preferable for a D2D relay UE to maintain maximum transmit power for all links.

Hence, according to the present embodiment, although the information on multiple links is delivered, such a field as power control can be commonly applied to the multiple links. By doing so, it may be able to reduce signaling overhead between the eNB and the D2D relay UE.

When the TPC field is individually configured, if the TPC field is commonly applied to the multiple links, it is able to solve ambiguity in controlling transmit power of a signal (e.g., a D2DSS, a PSBCH (physical sidelink broadcast channel), a D2D discovery signal, etc.) transmitted or broadcasted by the D2D relay UE. Regarding this, it shall be described later in detail.

(2) Second Type

The second type R-RNTI can indicate that a D2D grant indicated by R-RNTI provides information on a single relay target link. Hence, if information on multiple links is transmitted using the second type R-RNTI, it may be necessary to have a plurality of R-RNTIs.

(iv) In order to identify a plurality of second type R-RNTIs, it may perform indexing on a plurality of the second type R-RNTIs. For example, a plurality of the second type R-RNTIs can be indexed as R-RNTI '1', R-RNTI '2', . . . , R-RNTI 'N'. Each index can indicate priority of a link corresponding to an R-RNTI or association with a resource. More specifically, a D2D relay UE capable of relaying 2 links can use resources indicated by R-RNTI 1 and R-RNTI 2 for a D2D relay operation. If pluralities of resource pools are configured, it may assume that the R-RNTI 1 is associated with a first resource pool and the R-RNTI 2 is associated with a second resource pool. And, as mentioned in the following description, if pluralities of resource pools are configured, whether to use a resource pool can be determined by a UE ID or the like to prevent a D2D operation from being concentrated on a partial resource pool only.

(v) It may indicate to associate with priority or a resource pool according to a reception order of a D2D grant while not performing R-RNTI indexing. As a reference for determining the reception order of the D2D grant, a frame boundary or a frame boundary of SFN %10=0 can be defined in advance or can be signaled by an eNB. For example, if the frame boundary becomes a reference for determining the reception order of the D2D grant, D2D communication, which is granted by a D2D grant firstly received after a specific frame boundary, can be performed via a resource pool of a lower index or can be performed within a first resource pool starting after prescribed timing.

The priority and/or the association of the resource pools can be determined by a time/frequency position, an ID (e.g., transmission/reception UE ID, D2D link ID), or the like. For example, if a firstly starting resource pool has higher priority or resource pools have the same starting point in time domain, a resource pool located at a relatively lower frequency domain may have higher priority in the frequency domain. Of course, it may be able to define an opposite case as well. In order to prevent a collision in a resource pool having higher priority, it may be able to select a resource pool using a D2D ID (e.g., transmission/reception UEID) or the like.

When a D2D grant is applied to one of a plurality of resource pools, a resource pool to which the D2D grant is to be applied can be determined on the basis of a timing (e.g., subframe) at which the D2D grant is transmitted. For example, in order to secure an appropriate processing time for a D2D grant received in a subframe #n, it may be able to configure the D2D grant to be applied to a subframe #n+k or a resource pool firstly appearing after the subframe #n+k.

When two or more D2D grants are received and D2D data are transmitted in two or more resource pools, ambiguity may occur in configuring a parameter for transmitting a common signal to a plurality of resource pools. For example, in case of transmit power of a D2DSS (D2D synchronization signal) (e.g., primary sidelink SS, secondary sidelink SS), assume that a D2D UE receives two D2D grants in a prescribed time period, one D2D grant indicates maximum transmit power, and another D2D grant indicates to apply OLPC (open loop power control). In this case, D2D SA and data transmit power may follow a D2D grant in a resource pool associated with the D2D grant. However, ambiguity occurs on D2DSS transmit power. This is because, since a D2DSS plays a role of a synchronization reference for all signals transmitted by the D2D UE, it is unclear which TPC of a D2D grant is necessary to follow.

In other word, a D2D relay UE can relay at least two links different from each other and the at least two links can be transmitted with different power. However, since there is a single synchronization signal D2DSS transmitted from the D2D relay UE only, it is necessary to define a D2D grant to apply a power control parameter indicated by the D2D grant to the D2DSS.

As a method of solving the ambiguity, it may use options described in the following, by which the present invention may be non-limited.

Option 1: If D2DSS power parameters are differently configured by two D2D grants, a parameter of greater power is used. If there are 3 or more D2D grants, a parameter of max power is used.

Option 2: If D2DSS power parameters are differently configured by two D2D grants, power of D2DSS is configured according to a recently received D2D grant. If there are 3 or more D2D grants, a parameter of the lastly received D2D grant is used.

Option 3: If D2DSS power parameters are differently configured by two D2D grants, it is processed as an error case. In this case, a D2D UE does not transmit a synchronization signal until a valid D2DSS parameter is received or may transmit a D2DSS using previous transmit power.

Option 4: It may use a power parameter associated with an earlier index of a resource pool or high priority.

According to a further different embodiment, a D2D grant can be commonly applied to a plurality of resource pools. In particular, a D2D SA resource index, a data subframe pattern, and a frequency resource allocation field received via a single D2D grant can be commonly applied to a plurality of resource pools. An eNB can provide a set of resource pools to which a single D2D grant is commonly applied to a D2D UE via RRC signaling.

(vi) As a further different embodiment of not performing indexing on R-RNTI, it may be able to indicate priority of a D2D grant, association with an index or a resource pool, and the like using a reserved field or a reserved state in a current D2D grant. For example, since the current D2D grant is configured by an information bit number identical to a DCI format 0 for transmitting an uplink grant for eNB-UE communication, a D2D grant for D2D relay can add a resource pool indication field while maintaining a length identical to a length of the DCI format 0, i.e., the same information bit number.

Meanwhile, the aforementioned embodiments of the second type can be applied to the embodiments of the first type. For example, if resource allocation for a resource pool is not included in a D2D grant of the first type, each of control information transmitted via the D2D grant of the first type can be implicitly or explicitly associated with a specific resource pool. For example, multiple links indicated by the aforementioned methods can be sequentially associated with a resource pool of high priority. If the embodiments of the second type are not applied to the embodiment of the first type, information on a link of the D2D grant of the first type can also include information on a resource pool in which the link is included.

2. Multiple resource pools

In order to relay a plurality of D2D communications, an eNB can signal multiple resource pools. The signaled multiple resource pools can be used for the same purpose. For example, the multiple resource pools can be configured for D2D SA, D2D discovery or D2D communication. The eNB can configure a D2D SA resource pool 1, a D2D SA resource pool 2, . . . , a D2D resource pool N. The multiple resource pools can be signaled by a plurality of resource pool configurations or a resource pool configuration may include information on the multiple resource pools.

A plurality of the resource pool configurations can be more appropriate for such a communication scheme as a mode 2 that a D2D UE autonomously determines D2D SA and a resource for transmitting data. In the mode 2, it may be able to configure a single D2D UE to use single D2D SA and a data transmission resource only in a single resource pool. By doing so, it may be able to prevent a specific D2D UE from consuming excessively large amount of D2D SA and data resources in a single resource pool. More generally, an eNB can set an upper limit for the number of D2D SA messages capable of being transmitted by a D2D UE.

The multiple resource pools can be set to each D2D UE via SIB and higher layer signaling such as dedicated signaling and the like. A resource pool configuration can indicate a usage of a resource pool. For example, a resource pool used for unicast D2D and a resource pool used for a D2D relay operation can be separately signaled. Or, as mentioned in the foregoing description, in case of performing a D2D relay operation, a resource pool for transmission and a resource pool for reception can be separately signaled.

According to one embodiment of the present invention, multiple resource pools can be implemented in a manner that a resource pool is configured and a plurality of sub-pools are configured in the configured resource pool. To this end, a sub-pool configuration can be included in a resource pool configuration.

A D2D transmitter configured to perform a D2D relay operation is able to know a resource to be used for the D2D relay operation based on the aforementioned resource pool configuration and a D2D grant. A D2D signal can be transmitted in the resource.

3. Multiple D2D SAs

A method of transmitting multiple D2D SAs is proposed to relay multiple links. For example, it may consider multiple SAs transmission methods described in the following according to the number of D2D SAs capable of being transmitted per resource pool and a D2D communication mode in which a relay operation is performed.

(1) Case 1: Number of D2D SA Capable of being Transmitted Per Resource Pool Corresponds to 1

If multiple resource pools are configured, a D2D UE transmitting multiple D2D SAs can use a different resource pool according to each of the multiple D2D SAs. For example, if a single D2D SA is configured to be transmitted only in a resource pool, it is able to reduce such a problem as interference capable of being occurred due to the D2D UE that transmits multiple D2D SAs in a single resource pool.

(i) Mode 1: When a D2D UE performs resource allocation on multiple links using grants (i.e., SCI or D2D SA) on multiple D2D links in the mode 1, it is necessary to define a correlation between a D2D SA and a resource pool. To this end, similar to the R-RNTI of the second type, it may be able to define an indication field in each D2D SA to indicate a resource pool at which a link indicated by the D2D SA is located. In this case, in order to reduce blind decoding complexity on D2D SA, the number of information bits of the D2D SA can be configured in a manner of being identical to a DCI format (e.g., format 0). A correlation between D2D SA and a specific resource pool can be defined by a different R-RNTI as well.

(ii) Mode 2: A D2D transmitter can autonomously select a resource for a D2D operation from a resource pool in the mode 2. When multiple resource pools are configured, a D2D UE can select a resource pool from the multiple resource pools. In this case, it may be able to perform an operation similar to the (v) embodiment of the aforementioned (2) second type R-RNTI. For example, priority exists among resource pools and a resource pool to be used can be determined according to the priority.

For example, indexing is performed on the multiple resource pools to configure the resource pools to be used from a resource pool of a lower index. It may be able to configure a resource pool of a higher index to be used only when the number of links to be relayed by a D2D UE is not small. By doing so, flexibility of the resource pool of the higher index can be enhanced. Since it is able to anticipate that interference due to a D2D operation is not strong in the resource pool of the higher index, it may be able to assign more WAN (e.g., cellular) transmissions to the resource pool of the higher index compared to a resource pool of a lower index.

As a different method, it is able to reduce interference between D2D links by applying D2D utilization of a similar frequency to resource pools. For example, it may be able to select a resource pool based on a result of modulo calculation performed on a UE ID of a D2D transmitter. Specifically, when there are 4 resource pools, a resource pool to be used first can be selected from among the resource pools 0, 1, 2, and 3 by (D2D transmitter ID modulo 4) and required resource pools can be selected by increasing an index of the resource pools.

(2) Case 2: Case of Transmitting Multiple D2D SAs to Single Resource Pool

1) Single Resource Pool Configuration (i) Mode 1: Since a single resource pool is configured only, it is necessary for an eNB to signal resources for multiple links in the resource pool. In this case, if T-RPTs of the multiple links are not overlapped with each other in the same resource pool, resources of a different link are not overlapped with each other. However, if T-RPTs of which partial time resources are overlapped are allocated to multiple links, continuity of a frequency resource may cause a problem. In particular, when a D2D UE performs D2D transmission in the same subframe for a different link, if a discontinuous frequency resource is used, single carrier property may not be satisfied. As a method of solving the problem, when multiple links are relayed in the same resource pool, it may set the same T-RPT to the multiple links and contiguous resources can be used in frequency domain. According to the present embodiment, a bit length of a D2D grant can be reduced. For example, while a D2D grant supportive of relaying the multiple links uses a DCI format of a length identical to a length of a current D2D grant, it is able to increase the number of frequency resources in proportion to the number of links. In this case, a D2D grant for multiple links and a D2D grant for a single link can be distinguished from each other by R-RNTI, a reserved field in a D2D grant, a state, or the like.

(ii) Mode 1: According to a different embodiment, an eNB forwards a single T-RPT to a D2D relay UE and the D2D relay UE can independently perform data allocation for a plurality of D2D links in the T-RPT. For example, assume that the eNB forwards every even-numbered subframe to the D2D relay UE as T-RPT and the D2D relay UE performs transmission on two D2D links. In this case, the D2D relay UE divides the even-numbered subframes into two groups. The D2D relay UE uses even-numbered subframes positioned at an odd number group for first D2D link transmission and uses even-numbered subframes positioned at an even number group for second D2D link transmission. In this case, it may be able to transmit a plurality of D2D SAs as well. The eNB designates an individual D2D SA transmission resource or a set of D2D SA transmission resources. The D2D relay UE autonomously allocates a D2D SA transmission resource to each D2D link. Or, similar to the mode 2, the D2D relay UE may autonomously determine a D2D SA transmission resource.

(iii) Mode 2: In mode 2, a D2D relay UE can randomly select a resource from a resource pool configured by an eNB. In this case, as mentioned above, it is preferable to use the same T-RPT and contiguous frequency resources for multiple links. If a different T-RPT is used according to a link, it may use the contiguous frequency resources in overlapped time resource only.

2) Multiple Resource Pools Configuration

When multiple resource pools are configured, a D2D UE can report the number of required links to an eNB. The eNB can indicate a resource pool capable of transmitting multiple D2D SAs or signal the number of links capable of being transmitted per resource pool to the D2D UE based on the report of the D2D UE. If it is necessary to transmit D2D SAs for multiple links and/or data in a single resource pool, it may be able to apply the aforementioned embodiments of 1) single resource pool configuration to the resource pool.

4. D2D SA Indication

In the aforementioned embodiment, a method of transmitting information on multiple links in a resource region indicated by a D2D grant has been proposed to forward the information on the multiple links to a D2D transmitter while a format (e.g., length) of a current D2D grant is maintained. For example, when a D2D grant transmitted via (e)PDCCH indicates a partial resource belonging to a PDSCH region, if the D2D transmitter decodes the indicated PDSCH resource, it is able to identify information necessary for relaying the multiple links. The D2D grant may have an information length identical to one of current DCI formats. Information on whether or not corresponding DCI is used for D2D relay can be implicitly indicated by RNTI.

The method can also be used for the D2D transmitter to transmit D2D SAs for multiple links. The contents mentioned earlier in '3. (1) Case 1' are described on the premise of multiple resource pool configurations. Following description is described on the premise of single resource pool configuration or a case that a single D2D SA is available only although multiple links exist in a single resource pool among the multiple resource pool configurations. As a different interpretation, when information on multiple links is forwarded via D2D SA while a current D2D SA format is maintained, embodiments described in the following can be used.

Figure 11:
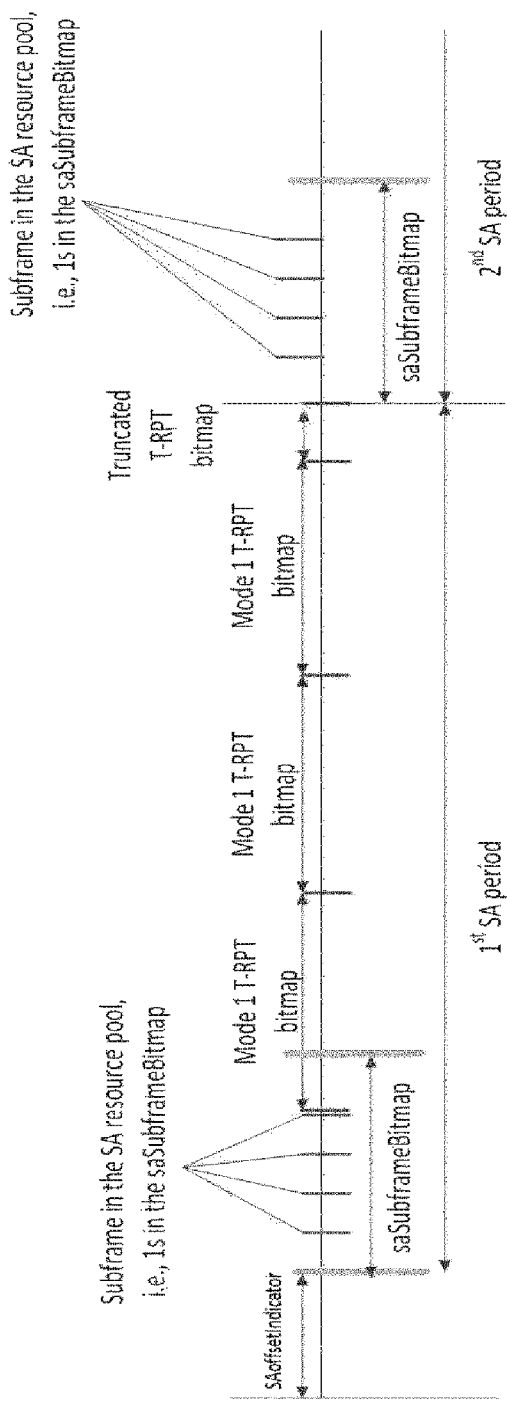
FIG. 11 is a diagram illustrating a method of transmitting a D2D SA and data in a D2D operation.

FIG. 11 is a diagram illustrating a method of transmitting a D2D SA and data in a D2D operation.

Transmission of D2D SA is performed in an SA resource pool configured for the usage of D2D SA transmission. An SA resource pool, an SA offset indicator (SAoffsetindicator), and an SA subframe bitmap (saSubframeBitmap) are set to a D2D UE via higher layer signaling or SIB.

The SA offset indicator indicates a timing at which an SA subframe bitmap starts. A D2D SA can be transmitted in a subframe position corresponding to '1' in an SA subframe bitmap.

Among values configured by '1' in the SA subframe bitmap, mode 1 data transmission may start from a next subframe of a subframe corresponding to the last '1' value. A length of a T-RPT bitmap indicated by D2D SA is repeated four times in a single D2D SA period. If 'T-RPT bitmap length * 4' exceeds a single D2D SA period, fourth T-RPT bitmap is truncated.

In summary, a D2D transmitter can transmit D2D SA at a position indicated by a D2D grant and transmits D2D data based on T-RPT indicated by an eNB from a timing determined after the D2D SA is transmitted. The D2D data is repeatedly transmitted 4 times.

According to one embodiment of the present invention, a method of transmitting information on multiple links is proposed while the D2D transmission scheme mentioned earlier in FIG. 11 is maintained as much as possible.

According to one embodiment of the present invention, D2D SA indication information is proposed. The D2D SA indication may play a role of an indicator indicating a resource in which control information on an actual individual D2D link is transmitted. Control information on multiple links can be transmitted in a resource indicated by the D2D SA indication. An actual D2D SA for each link can be transmitted in the resource indicated by the D2D SA indication. In this case, the control information can be configured by content of current D2D SA (e.g., SCI) and additional information.

After the actual D2D SA is transmitted, data can be transmitted according to each link. For example, the present invention proposes that a D2D relay UE configured to relay multiple links transmits actual D2D SA for each link in a partial period (e.g., Mode 1 T-RPT bitmap in FIG. 11) in which D2D data is transmitted to notify information on each link transmitted by the D2D relay UE.

Referring to FIG. 11, information, which is transmitted in a period (e.g., SA subframe in FIG. 11) in which D2D SA is transmitted, plays a role in designating a resource in which actual D2D SA is transmitted (i.e., D2D SA indication). And, the actual D2D SA for each link is transmitted in the resource indicated by the D2D SA indication and D2D data of each D2D link can be transmitted from an end point of the actual D2D SA transmission period based on actual D2D SA information. For example, when the D2D relay UE transmits D2D SA, data, which is transmitted in a partial forepart resource among data resources designated by the D2D SA, corresponds to control information including information on an individual D2D link rather than user data.

According to the present embodiment, it is able to reduce D2D SA blind detection complexity of a D2D receiver. For example, when multiple D2D SAs are transmitted, since a location to which actual D2D SA is transmitted is indicated by D2D SA indication, the D2D receiver performs blind detection on the D2D SA indication only instead of performing blind detection on each of the multiple D2D SAs. And, since it is able to indicate a resource for transmitting actual D2D SA using the D2D SA indication, it may be able to more flexibly configure a D2D SA information size.

According to the scheme shown in FIG. 11, D2D communication is performed in an order of '1. D2D SA transmission ->2. D2D data transmission'. On the contrary, according to the present embodiment, D2D communication is performed in an order of '1. D2D SA indication transmission ->2. D2D SA transmission ->3. D2D data transmission'. As a result, complexity in transmitting multiple D2D SAs and performing blind decoding on the multiple D2D SAs can be reduced. In FIG. 11, it may be able to have a merit in that it is able to increase a limitative D2D SA information size.

If the D2D SA information size (or resource size) is increased, additional information can be included in D2D SA. For example, if a feedback operation is applied in a future D2D system, in order for a D2D receiver to transmit feedback information to a D2D transmitter, the D2D receiver may signal information on an allocated resource (resource allocation information).

The D2D receiver can transmit feedback information on a D2D link via a resource designated by D2D SA and the feedback information can include ACK/NACK information, CSI, power control information, and the like.

Figure 12:
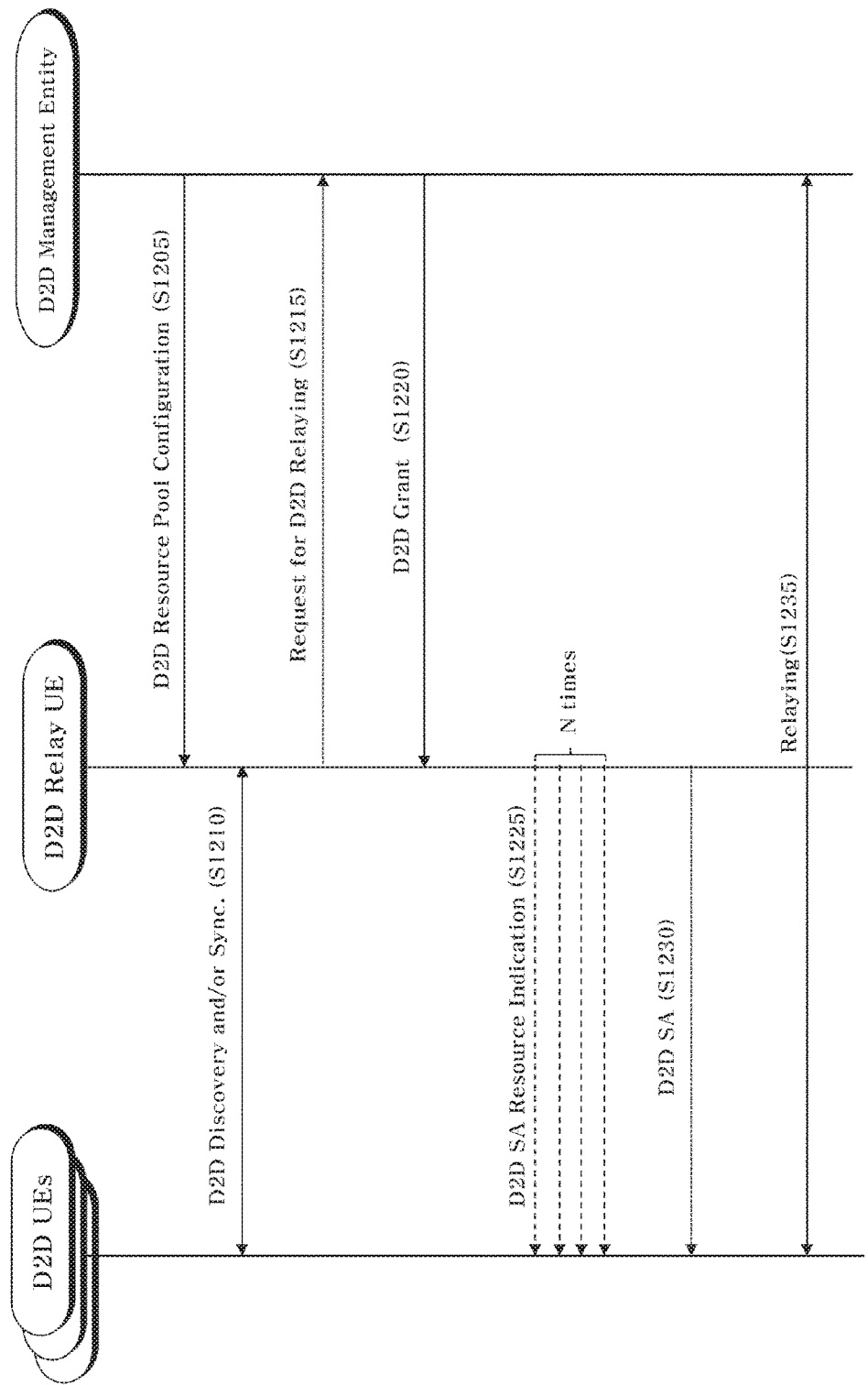
FIG. 12 is a flowchart for a D2D relay operation according to one embodiment of the present invention.

FIG. 12 is a flowchart for a D2D relay operation according to one embodiment of the present invention. Explanation on contents overlapped with the aforementioned contents can be omitted.

In FIG. 12, although it is assumed as a D2D relay UE communicates with a plurality of D2D UEs, embodiments of the present invention can also be applied to a case of relaying a single D2D UE. And, assume that the D2D relay UE belongs to the coverage of a D2D management entity. The D2D management entity may correspond to a random node for managing a D2D resource and the like. For example, the D2D management entity may correspond to an eNB, a cell, a TP, a head of a D2D UE cluster, or a radio node becoming a reference for synchronization of the D2D relay UE, by which the present invention may be non-limited. In the following, for clarity, assume that the D2D management entity corresponds to the eNB.

Referring to FIG. 12, the eNB transmits a D2D resource pool configuration to a D2D relay UE [S1205]. The D2D resource pool configuration can be provided via SIB (system information block) or RRC signaling. Multiple resource pools can be set to the D2D relay UE. The resource pools can include an SA resource pool, a synchronization resource pool, a discovery resource pool, a data resource pool, and the like. Each of the SA resource pool, the synchronization resource pool, the discovery resource pool, and the data resource pool can be configured by multiple pools.

The D2D relay UE performs a D2D discovery and/or a D2D synchronization operation with neighboring D2D UEs [S1210]. The D2D relay UE can detect D2D UEs required to be relayed via the D2D discovery and/or the D2D synchronization operation. Assume that there are multiple D2D UEs required to be relayed.

The D2D relay UE transmits a D2D relay request including information on multiple D2D links capable of performing relay to the eNB [S1215]. The D2D relay request can include at least one of the number multiple D2D links, sizes of D2D resources necessary for relaying the multiple D2D links, and a headroom report on D2D processing capability of the D2D relay UE. The D2D relay request can be transmitted via PUCCH or PUSCH. According to one embodiment, the D2D relay request can be performed by a UCI format or an IE (information element) of RRC layer, by which the present invention may be non-limited.

The D2D relay UE obtains at least one D2D grant from the eNB based on one of multiple radio network temporary identities (RNTIs) assigned to the D2D relay UE [S1220]. In this case, the multiple RNTIs can include at least one of D2D-RNTI (e.g., SL-RNTI) and R-RNTI. Besides, the multiple RNTIs can include system information RNTI, cell-RNTI, paging-RNTI, TPC-RNTU, and the like, by which the present invention may be non-limited. And, the D2D grant can be transmitted via (e)PDCCH.

If the at least on received D2D grant corresponds to a D2D grant for approving the D2D relay request, the at least one D2D grant can be indicated by a second RNTI (e.g., R-RNTI) different from a first R-RNTI (e.g., D2D-RNTI) for approving the D2D synchronization operation or the D2D discovery operation among the multiple RNTIs. In the present embodiment, assume that RNTI different from the D2D synchronization operation or the D2D discovery operation is used for the D2D relay operation, by which the present invention may be non-limited. The first RNTI or the second RNTI corresponds to a representative example of identifiers assigned to the D2D relay UE.

If the D2D grant is indicated by the second RNTI, the indication by the second RNTI may be an implicit indication scheme in which cyclic redundancy check (CRC) of the D2D grant is scrambled by the second RNTI. Or, it may be an explicit indication scheme in which reserved bits of the D2D grant is set to the second RNTI.

If a single D2D grant is provided for multiple D2D links, the single D2D grant can indicate at least one of a resource pool for each of the multiple D2D links, a combination of D2D scheduling assignment (SA) resources for the multiple links, and a data region resource to which information on the D2D SA resources is transmitted.

On the contrary, if multiple D2D grants are provided for the multiple D2D links, a different index can be assigned to second RNTI of each of the multiple D2D grants. And, it may be able to indicate association information between the multiple D2D links and the multiple resource pools or priority information among the multiple D2D links based on at least one of an order of receiving the multiple D2D grants, an index of the second RNTI, and an scheduling assignment (SA) resource indicator field included in the multiple D2D grants.

At least one D2D grant can include control information (e.g., TPC) common to the multiple D2D links and control information specific to each of the multiple D2D links.

The D2D relay UE can transmit multiple D2D scheduling assignments (SAs) for scheduling the multiple D2D links through at least one D2D resource pool based on D2D resource information. A D2D resource pool may belong to an SA resource pool or a data resource pool [S1230].

According to one embodiment, the multiple D2D SAs can be transmitted in a data subframe located after SA subframes in which control information of a single D2D SA format is transmitted. In this case, the control information of the single D2D SA format transmitted in the SA subframes can be configured to include location information of the multiple D2D SAs transmitted in the data subframe [S1225].

The D2D relay UE transceiver data with the D2D UEs based on the multiple D2D SAs to perform a D2D relay operation [S1235].

Apparatus According to Embodiments of the Present Invention

Figure 13:
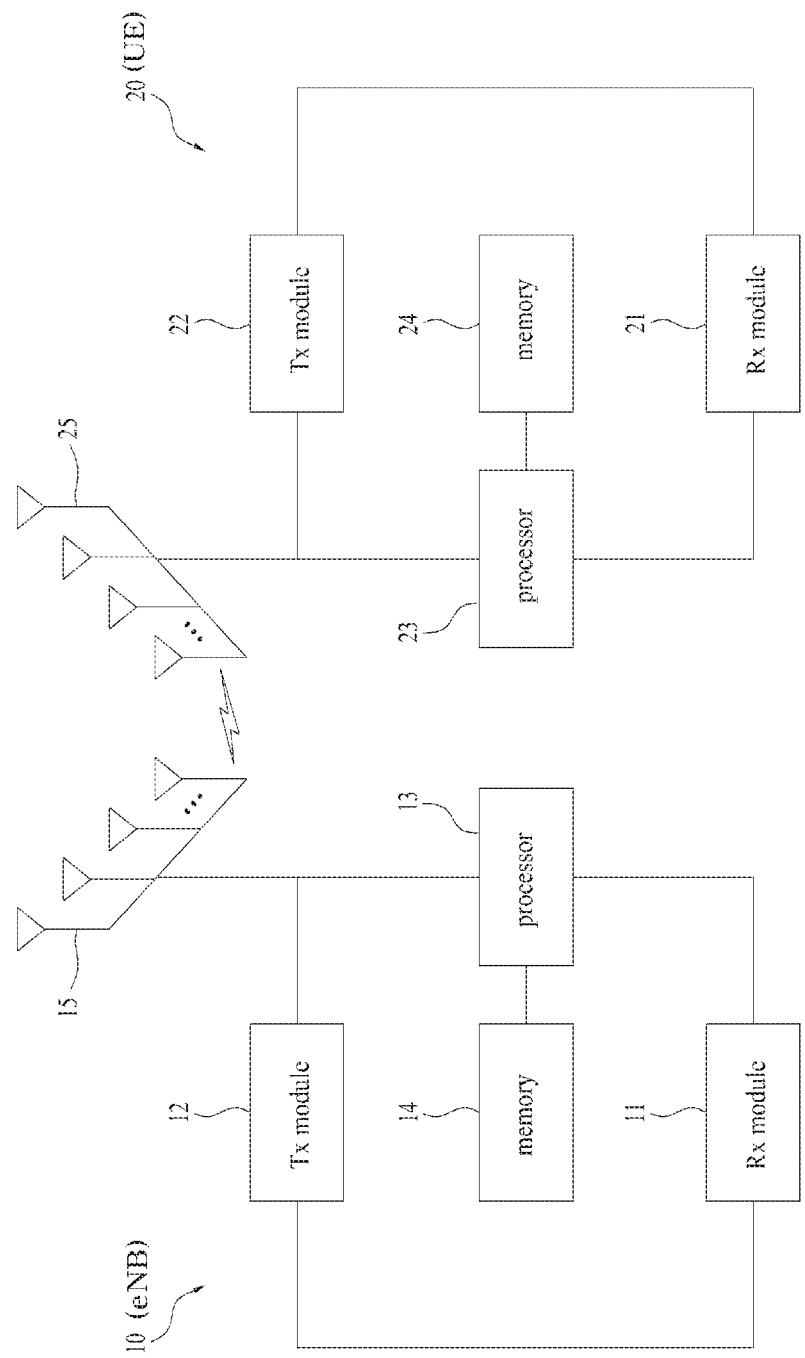
FIG. 13 is a diagram for a configuration of a transceiver according to one embodiment of the present invention.

FIG. 13 is a diagram for a user equipment and a transmission point according to one embodiment of the present invention. The user equipment and the transmission point shown in FIG. 13 can perform the aforementioned embodiments.

Referring to FIG. 13, a transmission point 10 can include a reception module 11, a transmission module 12, a processor 13, a memory 14 and a plurality of antennas 15. A plurality of the antennas 15 correspond to a transmission point supporting MIMO transmission and reception. The reception module 11 can receive various signals, data and information from the user equipment in UL. The transmission module 12 can transmit various signals, data and information to the user equipment in DL. The processor 13 can control overall operation of the transmission point 10.

The processor 13 of the transmission point 10 can process items necessary for each of the aforementioned embodiments.

Besides, the processor 13 of the transmission point 10 performs a function of calculating and processing information received by the transmission point 10, information to be transmitted to the external and the like. The memory 14 can store processed information for prescribed time and can be replaced with such a configuration element as a buffer (not depicted).

Referring to FIG. 13, a user equipment 20 can include a reception module 21, a transmission module 22, a processor 23, a memory 24 and a plurality of antennas 25. A plurality of the antennas 25 correspond to a UE supporting MIMO transmission and reception. The reception module 21 can receive various signals, data and information from the base station or a D2D UE in DL. The transmission module 22 can transmit various signals, data and information to the base station or the D2D UE in UL. The processor 23 can control overall operation of the user equipment 1420.

The processor 23 of the user equipment 20 can process items necessary for each of the aforementioned embodiments.

Besides, the processor 23 of the user equipment 20 performs a function of calculating and processing information received by the user equipment 1420, information to be transmitted to the external and the like. The memory 1424 can store processed information for prescribed time and can be replaced with such a configuration element as a buffer (not depicted).

For a concreate configuration of the user equipment and the transmission point, items mentioned earlier in various embodiments of the present invention can be independently applied or two or more embodiments can be applied at the same time. For clarity, explanation on contents overlapped with the aforementioned contents is omitted.

And, in explaining FIG. 13, if a relay becomes a downlink transmission entity from the transmission point 10 or an uplink reception entity to the transmission point, or the relay becomes a downlink reception entity from the UE or an uplink transmission entity to the UE, the principle of the present invention can also be identically applied to the relay via various embodiments of the present invention.

The embodiments of the present invention may be achieved by various means, for example, hardware, firmware, software, or a combination thereof In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

What is claimed is:

1. A method of performing a device-to-device (D2D) relay operation by a D2D user equipment (UE) supporting D2D communication, the method comprising:
    transmitting, to a base station, a D2D relay request containing information on multiple D2D links capable of being relayed;
    obtaining at least one D2D grant from the base station based on one of multiple radio network temporary identities (RNTIs) assigned to the D2D UE; and
    transmitting, through at least one D2D resource pool, multiple D2D scheduling assignments (SAs) for scheduling the multiple D2D links, based on D2D resource information,
    wherein when the at least one D2D grant approves the D2D relay request, the at least one D2D grant is indicated by a second RNTI different from a first RNTI used for approving a D2D synchronization operation or a D2D discovery operation among the multiple RNTIs,
    wherein the multiple D2D SAs are transmitted in a data subframe following SA subframes in which control information of a single D2D SA format is transmitted, and wherein the control information of the single D2D SA format transmitted in the SA subframes comprises location information of the multiple D2D SAs transmitted in the data subframe.

2. The method of claim 1, wherein an indication by the second RNTI corresponds to an implicit indication by scrambling a cyclic redundancy check (CRC) of the D2D grant with the second RNTI or an explicit indication by setting reserved bits of the D2D grant as the second RNTI.

3. The method of claim 1, wherein the D2D relay request comprises at least one of a number of the multiple D2D links, sizes of D2D resources required for relaying the multiple D2D links, and a headroom report for D2D processing capability of the D2D UE.

4. The method of claim 1, wherein when a single D2D grant is provided for the multiple D2D links, the single D2D grant indicates at least one of a resource pool for each of the multiple D2D links, a combination of D2D scheduling assignment (SA) resources for the multiple D2D links, and a data region resource in which information on the D2D SA resources is transmitted.

5. The method of claim 1, wherein when multiple D2D grants are provided for the multiple D2D links, a different index is assigned to the second RNTI of each of the multiple D2D grants.

6. The method of claim 5, wherein association information between the multiple D2D links and multiple resource pools or priority information among the multiple D2D links is dedicated based on at least one of an order of receiving the multiple D2D grants, an index of the second RNTI, and an scheduling assignment (SA) resource indicator field contained in the multiple D2D grants.

7. The method of claim 1, wherein the at least one D2D grant comprises control information common to the multiple D2D links and control information specific to each of the multiple D2D links.

* * * * *